United States Patent [19]

Kim et al.

[11] Patent Number: 4,751,061
[45] Date of Patent: Jun. 14, 1988

[54] PROCESS FOR RECOVERING SCANDIUM FROM WASTE MATERIAL

[75] Inventors: Tai K. Kim, Towanda; Robert P. McClintic, Monroeton, both of Pa.

[73] Assignee: GTE Products Corporation, Stamford, Conn.

[21] Appl. No.: 44,170

[22] Filed: Apr. 30, 1987

[51] Int. Cl.$^4$ ............................................. C22B 3/00
[52] U.S. Cl. ................................ 423/21.5; 75/101 R
[58] Field of Search ................ 75/101 R; 423/21.5, 423/112; 210/685, 732

[56] References Cited

U.S. PATENT DOCUMENTS

| | | | |
|---|---|---|---|
| 4,051,230 | 9/1977 | Miyauchi | 423/21.5 |
| 4,279,791 | 7/1981 | Speakman | 423/21.5 |
| 4,624,703 | 11/1986 | Vanderpool et al. | 75/101 R |
| 4,631,177 | 12/1986 | Yotsuyanagi et al. | 423/112 |

FOREIGN PATENT DOCUMENTS

| | | | |
|---|---|---|---|
| 0164638 | 9/1984 | Japan | 423/21.5 |
| 0778780 | 11/1980 | U.S.S.R. | 423/21.5 |

*Primary Examiner*—John Doll
*Assistant Examiner*—Wayne A. Langel
*Attorney, Agent, or Firm*—Donald R. Castle; L. Rita Quatrini

[57] ABSTRACT

A process is disclosed for recovering scandium from impure scandium bearing material. The process involves contacting a solution of scandium which contains impurities, with a solvent impregnated resin consisting essentially of a solid polymeric medium in which is dispersed a liquid alkyl phosphoric acid as a cation extracting agent to extract essentially all of the scandium by the extracting agent without extracting appreciable amounts of impurities, and removing the scandium from the resin.

2 Claims, No Drawings

PROCESS FOR RECOVERING SCANDIUM FROM WASTE MATERIAL

This invention relates to a process for recovering scandium from impure scandium bearing material by a contacting an impure scandium solution with a cation extracting agent which is dispersed in a solid polymeric medium to remove the scandium from the solution and the bulk of the impurities.

BACKGROUND OF THE INVENTION

When tungsten ores such as scheelite, wolframite, huebnerite or mixtures thereof are digested in an alkali medium, the calcium, iron, and manganese which are present in the ores are precipitated or form an insoluble material which is separated from an alkali tungstate solution by filtration. A caustic digestion process of various tungsten ores is described in U.S. Pat. No. 3,911,007. Since the ores vary in composition, this insoluble material can contain additional elements as scandium, aluminum, niobium, tin, molybdenum, magnesium, possibly sulfur and phosphorus, etc. Also because the digestion for tungsten is not always efficient, the residue can contain some tungsten. It is desirable from an economic and environmental standpoint to recover the scandium from such residues.

U.S. Pat. No. 4,624,703 relates to a process for recovering scandium, tungsten, iron, and manganese which includes a step to recover scandium from solution by extraction with a dialkyl phosphoric acid which is dissolved in an aromatic solvent. Hence this process is a liquid-liquid extraction. Such liquid-liquid extraction processing requires a heavy outlay of capital equipment and is labor intensive.

The present invention makes use of an alkyl phosphoric acid to extract scandium in a system which makes use of relatively simple equipment and is much less labor intensive. Therefore, the process is very economical compared to prior art methods.

SUMMARY OF THE INVENTION

In accordance with one aspect of this invention, there is provided a process for recovering scandium from impure scandium bearing material. The process involves contacting a solution of scandium which contains impurities with a solvent impregnated resin consisting essentially of a solid polymeric medium in which is dispersed a liquid alkyl phosphoric acid as a cation extracting agent to extract essentially all of the scandium by the extracting agent without extracting appreciable amounts of impurities, and removing the scandium from the resin.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The starting impure scandium bearing material is a solution containing scandium and typically one or more of the impurities of iron, manganese and tungsten. Other impurities such as aluminum, niobium, tin, calcium, chromium, magnesium, molybdenum, titanium, and others can also be present in the solution. A typical analysis of such a solution is about 60 mg Sc/l, about 39 g Fe/l, about 19 g Mn/l, about 0.40 g W/l.

A preferred source of this solution is to solubilize the scandium from waste residues from alkali digestion processing of tungsten ores. However, the solution can be obtained from any source.

It is necessary that the solution be made acidic if it is not acidic, with the pH being no greater than about 3. This is the acidity range at which the alkyl phosphoric acid works most effectively. The process of this invention works best in the pH range of from about −0.9 to about −0.8.

The solution is contacted with a solvent impregnated resin consisting essentially of a solid polymeric matrix in which is dispersed a liquid alkylphosphoric acid as a cation extracting agent. The preferred alkylphosphoric acid is the dialkyl phosphoric acid di(2-ethylhexyl) phosphoric acid or D-2-EHPA.

The formula of the dialkyl phosphoric acid is:

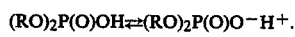

$$(RO)_2P(O)OH \rightleftarrows (RO)_2P(O)O^- H^+.$$

In this case, one of the alkyl groups (R) is 2-ethyl hexyl.

The polymeric matrix is preferably polystyrene.

A preferred solvent impregnated resin is manufactured by Mobay Chemical Corporation under the name of "Lewatit VP OC 1026. This type of resin consists of polystyrene as the inert matrix in which is impregnated di(2-ethylhexyl) phosphoric acid as the solvent which serves as the extracting agent. The production of this type of resin is carried out by a bead polymerization process in which the solvent or extracting agent is first incorporated in the monomeric mixture which is then polymerized. This particular resin contains about 15% by weight of the extracting solvent.

The above described resin is different from resins in which the functional group is incorporated into the medium. In the above described resin the functional group, that is, the exchangeable cation (hydrogen ion) of the alkylphosphoric acid, is physically impregnated into an inert matrix.

Basically the mechanism of extraction involves an exchange of the available hydrogen of the dialkyl phosphoric acid for the scandium which is in the cationic form. The extracting agent is selective for scandium over the other impurities, in particular the iron and manganese.

In accordance with a preferred embodiment, the proper amount of resin is introduced into a column and the solution is passed through the column. The amount of resin that is used depends on the amount of scandium that is to be removed and can be determined by anyone of ordinary skill in the art.

The effluent from the column is analyzed for scandium and other impurities if necessary. At first, there will be no scandium in the effluent indicating that it is being extracted by the resin. When scandium begins to be present in the effluent, the extracting agent is becoming loaded with scandium.

It is desirable to wash the resin to remove impurities such as iron. This is done by passing dilute hydrochloric acid (typically about 2N) through the column.

Scandium is then recovered from the resin. This is done by burning the resin to leave a scandium-rich residue. The residue contains typically about 2% by weight scandium as opposed to the level of scandium in the starting waste materials which contain typically from about 40 to 50 weight ppm of scandium. The scandium-rich residues produced as a result of the practice of this invention can be further upgraded by standard methods and scandium can be recovered for use such as in lasers and other electronic equipment.

The use of a resin in which is impregnated a solvent or liquid extracting agent affords an advantage over liquid-liquid exchange techiques which require an outlay of capital equipment. In the process of the present invention all that is needed is a column with the resin.

To more fully illustrate this invention, the following non-limiting example is presented.

EXAMPLE

A scandium solution derived from solubilizing residues from tungsten ore processing is used as the starting material in this example. The solution contains about 60 mg Sc/l/, about 39 g Fe/l, about 19 g Mn/l, and about 0.40 g W/l and is at a pH of about −0.9. About 100 g of Lewatit VP OC 1026 D-2-EHPA impregnated resin is placed in a glass column and about 3 liters of the above described feed solution is passed through the column at about 13.5 ml/minute. The fractions of effluent are collected and analyzed for Sc, Fe, and Mn. The results are summarized in the Table.

TABLE

| Fraction | Volume ml | Sc g/l | Fe g/l | Mn g/l | % Extraction Sc | Fe | Mn |
|---|---|---|---|---|---|---|---|
| 1 | 300 | 0.007 | 39 | 20 | 88.3 | 0.0 | 0.0 |
| 2 | 600 | <0.001 | 39 | 20 | ~100.0 | 0.0 | 0.0 |
| 3 | 600 | 0.002 | 42 | 21 | 96.7 | 0.0 | 0.0 |
| 4 | 600 | <0.002 | 40 | 20 | ~100.0 | 0.0 | 0.0 |
| 5 | 900 | 0.002 | 39 | 20 | 96.7 | 0.0 | 0.0 |
| Feed Solution | | 0.06 | 39 | 19 | — | — | — |

The data in the Table show the selective extraction of scandium over iron and manganese by the D-2-EHPA impregnated resin.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering scandium from impure scandium bearing material, said process comprising:
   (a) contacting a solution of scandium which contains impurities, with a solvent impregnated resin consisting essentially of a solid polymeric medium in which is dispersed a liquid alkylphosphoric acid as a cation extracting agent to extract essentially all of the scandium by said extracting agent, without extracting appreciable amounts of said impurities; and
   (b) removing said scandium from said resin.

2. A process of claim 1 wherein said resin consists essentially of polystyrene as said polymeric medium and di(2-ethylhexyl) phosphoric acid as said cation extracting agent.

* * * * *